July 16, 1957 — J. J. VANIER ET AL — 2,799,407
APPARATUS FOR UNLOADING BULK PRODUCTS
Filed Feb. 21, 1955 — 3 Sheets-Sheet 1

JOHN S. VANIER
JOHN T. LANDES
INVENTOR.

BY
ATTORNEY

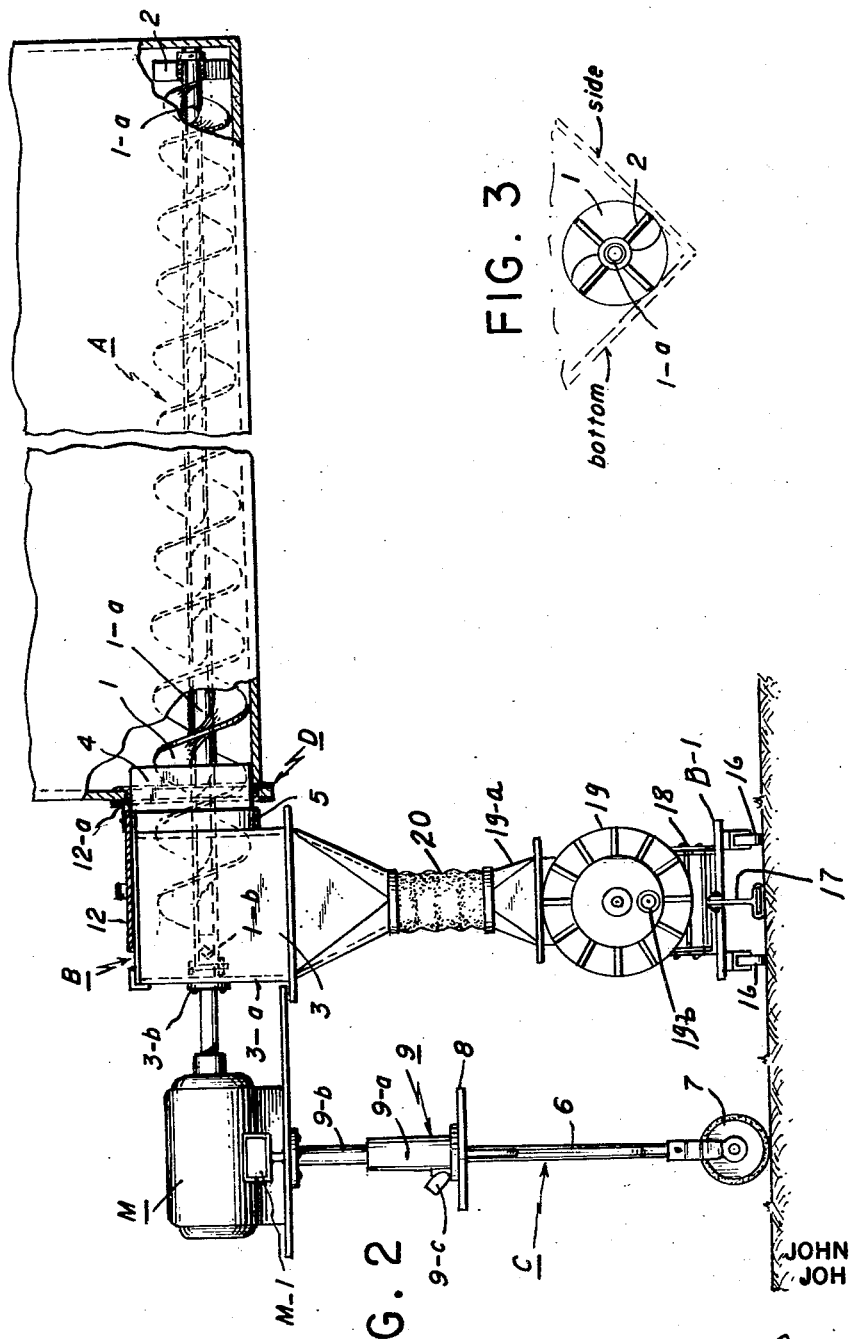

JOHN S. VANIER
JOHN T. LANDES
INVENTORS

BY
ATTORNEY

---
United States Patent Office 2,799,407
Patented July 16, 1957

---

2,799,407

APPARATUS FOR UNLOADING BULK PRODUCTS

John J. Vanier and John T. Landes, Salina, Kans., assignors to The Western Star Mill Co., Salina, Kans., a corporation of Kansas Application February 21, 1955, Serial No. 489,676

6 Claims. (Cl. 214—17)

The invention consists in a new and useful improvement in apparatus for unloading bulk products and has been developed as a solution of the problem of unloading bulk products from railroad cars. However, the device can be used to unload bulk products from any storage container, one end of which can be elevated. Before its development, unloading has constituted a major difficulty in the transportation and storage of bulk products. Many products have never been handled in bulk, because no practical method and means for unloading has been developed. While individual methods and means of unloading particular products have been developed, such methods and means usually require the re-design of existing storage and transportation equipment, making such equipment specialized for handling particular products. Other methods have been developed which require installation of very expensive handling equipment, such as wheat-car dumping machinery.

The device of this invention has been designed to furnish means for practicing an efficient and inexpensive method of rapidly unloading bulk products from railroad cars and other storage and transportation containers. The device is a new, distinct and valuable advance in the field of bulk product handling.

It consists in the combination of a portable stand on which is mounted a motor for driving a conveyor screw, and an adapter mounted on the storage container. The device can be moved to the container and placed opposite the adapter. The forward end of the conveyor screw is inserted into the container, through a door of the adapter. The motor is energized and the screw draws itself into the bulk product in the container, until its forward end reaches the opposite side of the container, at which time quick-acting snaps are tightened. The bulk product is conveyed by the screw into a discharge hopper from which the bulk product can be moved as desired. As the unloading proceeds, the end of the car or container which is opposite the end into which the screw entered is lifted and swung upwardly approximately 45° with the horizontal where it is held until unloading is completed. Thus the container can be completely unloaded rapidly and efficiently. The conveyor screw is specially designed so that the container is evenly unloaded and the screw does not contact the walls of the container. The screw conveys the bulk product directly into the discharge hopper.

One specific embodiment of the invention is illustrated in the drawings and hereinafter fully described, and it is to be distinctly understood that the invention is not considered to be limited to said specific embodiment but its scope is defined by the claims appended hereto.

In the drawings:

Fig. 2 is a side elevation of the device in position for unloading the bulk product from the railroad car.

Fig. 3 is an enlarged, fragmentary section of a corner of the car when it is lifted to cause the product to be fed by gravity to the screw.

Figure 1:
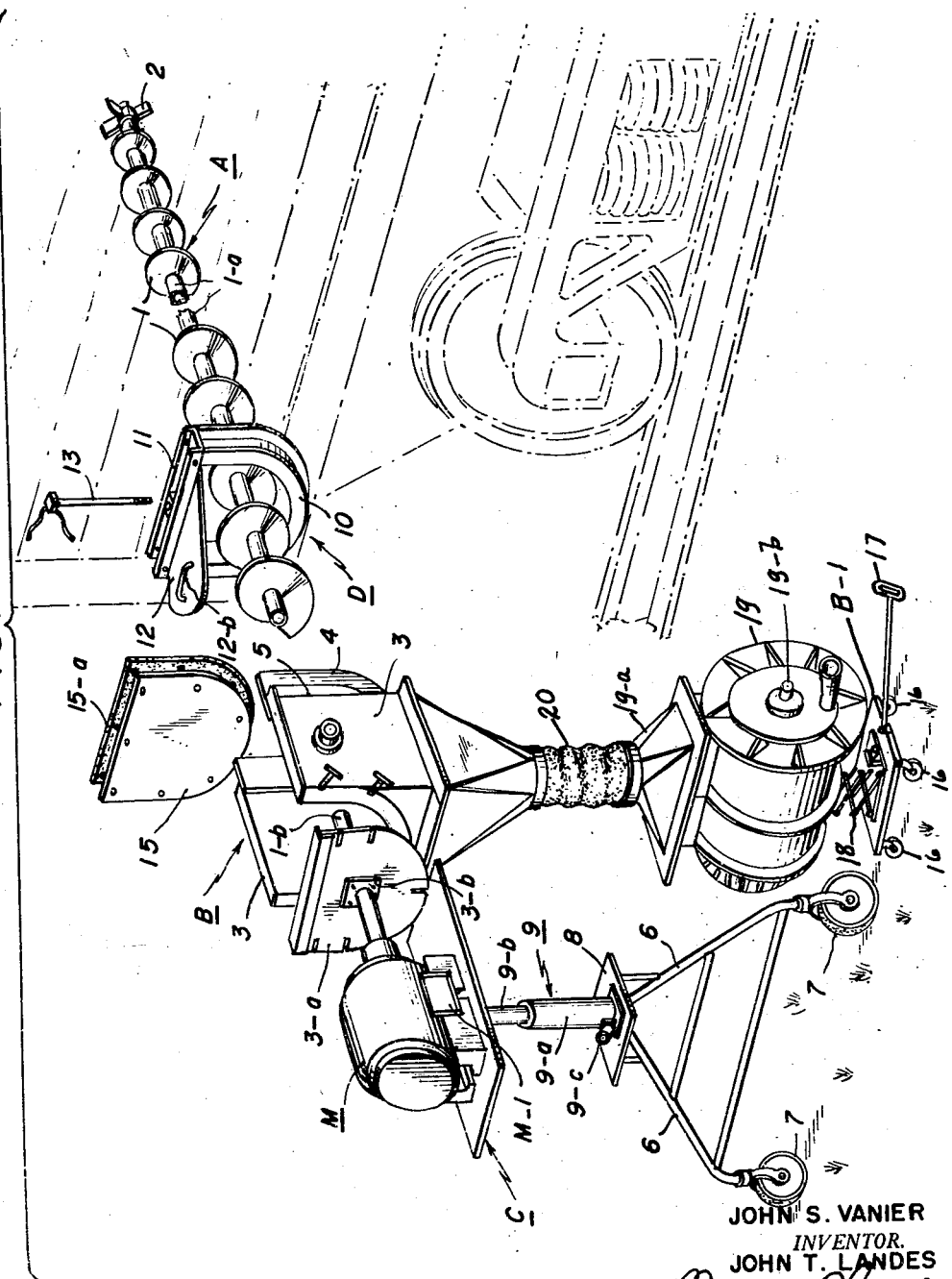
Fig. 1 is an exploded perspective of the device, a portion of the railroad car being shown in broken lines.
Figure 4:
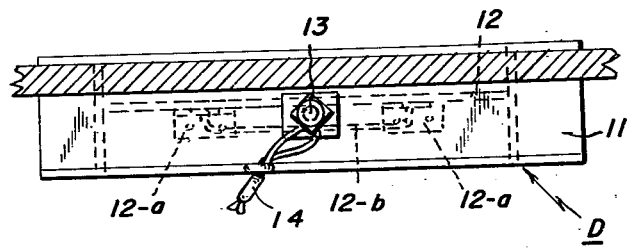
Fig. 4 is a top plan of the frame of the adapter mounted on the container.
Figure 5:
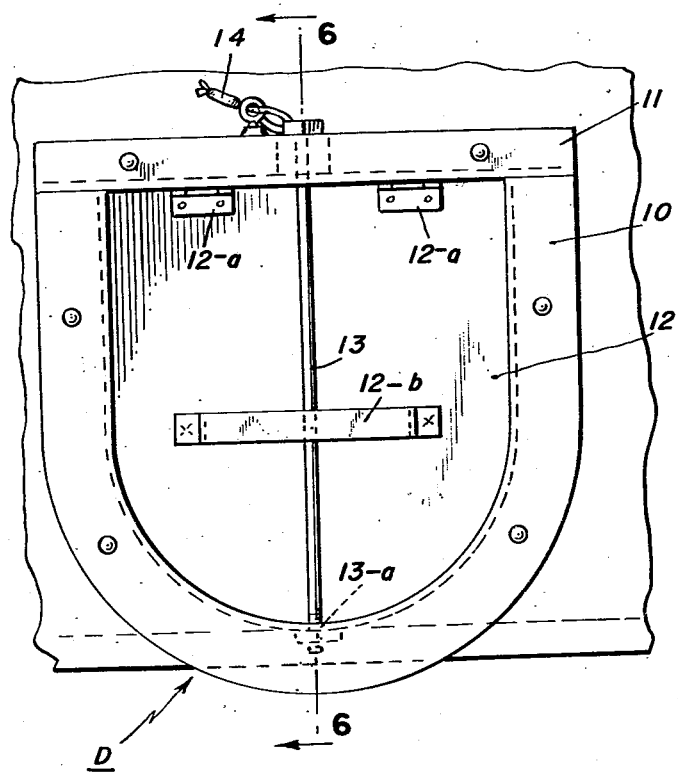
Fig. 5 is a front elevation of said frame.
Figure 6:
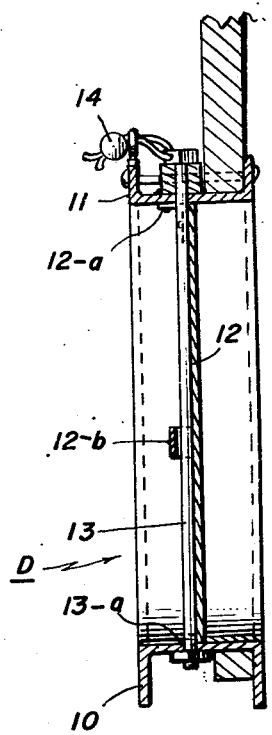
Fig. 6 is a vertical section on the line 6—6 of Fig. 5.

As illustrated in the drawings, the device comprises a conveyor screw A, a discharge hopper B, a motor stand C and an adapter D. The conveyor screw A is composed of a variable pitch and taper screw 1, the length of which may be adjusted for the width of the container to be unloaded. The center shaft 1–a of the screw 1 is uniform in diameter. The outside diameter of the screw 1 is tapered from the end adjacent the motor to the other end, from 12 inches to 6 inches. Approximately 6 inches from the tip of the screw 1, a self-aligning bearing and fin 2 are carried by the shaft 1–a of the screw 1, which act as a guide and align the tip of the screw 1 so that the screw does not contact the container. The discharge end of the screw 1 delivers the bulk product into the discharge hopper B. The screw shaft 1–a, at the discharge end of the screw 1 is attached to a drive coupling 1–b.

The discharge hopper B is constructed of steel panels 3. The rear panel 3–a contains the shaft bearing 3–b through which the screw shaft 1–a operates. The motor stand C is connected to the rear panel 3–a, on which the motor M is mounted. The function of the discharge hopper B is to act as a container for the bulk product as it leaves the conveyor screw A, and for conducting the bulk product into the user's conveyance. The discharge from the hopper B can be of any suitable form to give the best results with the user's conveyance.

The front lip 4 of the discharge hopper B extends about ¾ of an inch beyond the front panel 5. When the screw 1 has fully entered the container, this front lip 4 fits into the adapter D, against the bottom and sides thereof to form a seal between the adapter and hopper. The front panel 5 has snap notches into which quick acting snaps are placed to fasten the hopper B to the adapter D. Quick acting snaps are also attached to the rear edges of the side panels 3 and notches are cut in the rear panel 3–a.

The motor stand C comprises a frame of 1 inch steel pipe legs 6 mounted on rubber-tired wheels 7. The legs 6 join at a frame plate 8 through which an hydraulic jack operates. The function of the stand C is to carry the drive assembly, making the device easily moved by one man from one location to another. The rubber-tired wheels 7 make it possible to move the device over rough surfaces. The hydraulic jack 9 consists of a cylinder 9–a and a piston 9–b. It is operated by a hand lever 9–c attached thereto. The cylinder 9–a is attached to the plate 8 and the piston 9–b is attached to the bottom of the motor M. The function of the jack 9 is to raise and lower the screw 1 to proper position for entering the door of adapter D. The motor M is a one-horsepower electric motor, 68 R. P. M. It is mounted on the stand C which can be attached to the rear plate 3–a of the hopper B. The motor M is attached to the shaft 1–a of the screw 1 by the drive coupling 1–b. A switch M–1 is mounted on the stand C adjacent the motor M to be readily available to the operator.

The adapter D has a section of steel channel 10 formed into a U shape. The legs of section 10 are connected by another section of steel channel 11. To the inside lower edge of top section 11 a steel door 12 is attached by two hinges 12–a. The door 12 has a steel handle 12–b so that the door can be lifted to open the adapter D. A locking pin 13 passes vertically through the top section 11, through the handle 12 and into a pin-seat 13–a in the bight of the U section 12. The pin 13 is threaded through the section 11 and provision is made for a car-seal 14 through pin 13 so that the pin cannot be removed and the door 12 cannot be opened unauthorizedly.

An end plate 15 with gasket 15-a is bolted to the outside of the adapter D, covering the pin 13 and door 12. A quick-acting snap is mounted on each side of the adapter D. The front frame 5 of the hopper B is attached to the adapter D by means of snaps.

When the screw 1 has fully entered the container, the snaps on the rear edges of the side panels 3 are tightened against the notches in the rear plate 3-a of the hopper B and the device is held securely to the adapter D. It is to be understood that an opening, the size and shape of the inside of adapter D has been cut out of one corner of the wall of the long side of the container. The adapter D is attached to the wall over this opening, so that the door 12 lifts upwardly and outwardly. The inside surface of the section 10 and top section 11 are flush with said opening.

When a full car or container is to be unloaded, the adapter plate 15 is removed from the adapter D. The device is attached to the adapter D and the user's conveyance is attached to the hopper B, after the door 12 is opened, and the screw 1 is inserted through the adapter D into the container.

To provide mobility for the discharge hopper B so that it may be positioned relative the adapter D and motor stand C, the hopper B is mounted on a portable platform B-1 having casters 16 and a handle 17. A scissor jack 18 is mounted on the platform B-1 carrying any suitable form of flour actuator 19 having an intake 19-a and a discharge pipe 19-b for connection with the user's conveyance. The intake 19-a communicates by a flexible conduit 20 with the hopper B.

Having described our invention, what we claim is:

1. In apparatus for unloading a bulk product from a container through an orifice in the container, the combination of a screw conveyor; means adapted to actuate said conveyor; and means adapted to support said conveyor which comprises a platform supported by casters, a hopper vertically adjustable on said platform, attachable to the container, and into which said conveyor discharges, and means adapted to evacuate said hopper, said conveyor being adapted, when said supporting means and said actuating means are mobile relative the container, to move through the orifice into the container and through the product, and adapted, when said supporting means and said actuating means are rendered immobile relative the container, by fastening said supporting means in sealed contact with the container, and said conveyor has moved through the product, to convey the product from the container through the orifice.

2. In apparatus for unloading a bulk product from a container through an orifice in the container, the combination of a frame comprising U-shaped channels bolted to the container about the orifice; a door hinged to said frame and adapted to close the orifice; a plate removably bolted on said frame and having a gasket adapted to coact with said frame to seal said orifice when said plate is set up on said frame; a hopper removably bolted to said frame when said plate is removed; and a conveyor supported on said hopper, projected through the orifice when said door is opened, and adapted to convey the product from the container into said hopper.

3. An apparatus, according to claim 2, having a pin removably mounted in said frame and adapted to secure said door in closed position.

4. An apparatus, according to claim 2, in which said hopper is provided with casters for mobility.

5. An apparatus, according to claim 2, in which said hopper is provided with means adapted to evacuate the product from said hopper.

6. An apparatus, according to claim 2, in which said conveyor comprises a shaft of uniform diameter, a tapered screw of variable pitch carried by said shaft, and a bearing in which the outer end of said shaft is journaled, and having a plurality of pairs of diametrical, radial fins.

References Cited in the file of this patent

UNITED STATES PATENTS

| | | |
|---|---|---|
| 1,423,698 | Thurston | July 25, 1922 |
| 1,954,703 | Klein | Apr. 10, 1934 |
| 2,058,125 | Bean | Oct. 20, 1936 |
| 2,601,049 | Neighbour | July 17, 1952 |
| 2,610,727 | Beldin | Sept. 16, 1952 |
| 2,630,905 | Howe | Mar. 10, 1953 |